(No Model.)

I. FOX.

EYEGLASSES.

No. 296,826. Patented Apr. 15, 1884.

Attests.
G. B. McLain
Charles F. Wall

Inventor.
Ivan Fox

UNITED STATES PATENT OFFICE.

IVAN FOX, OF PHILADELPHIA, PENNSYLVANIA.

EYEGLASSES.

SPECIFICATION forming part of Letters Patent No. 296,826, dated April 15, 1884.

Application filed February 20, 1884. (No model.)

*To all whom it may concern:*

Be it known that I, IVAN FOX, of Philadelphia, Pennsylvania, have invented an Improvement in Eyeglasses, of which the following is a specification.

This invention has relation to eyeglasses, and has for its object the provision of a spring which cannot be bent out of shape or adjustment, and by means of which the lenses may be readily adjusted to the eyes and the frames conform to the arch of the nose, so as to have the focal center always coincident with the normal line of sight.

With reference to the points of novelty, this invention consists in making the spring in two parts or sections and connecting them by means of a stiff yoke of such a shape that they overhang the lenses or frames thereof and any undue strain on the springs will cause the glasses or frames containing them to abut against the yoke or against the ends of the springs where the latter are attached to the yoke, and thus prevent any further straining or bending of the spring. Incidental to this feature or advantage, the invention involves the additional point that, by reason of the independent arrangement of the springs, either glass may be separately adjusted to the sight, so as to accommodate it to any abnormal optical condition.

Figure 1:
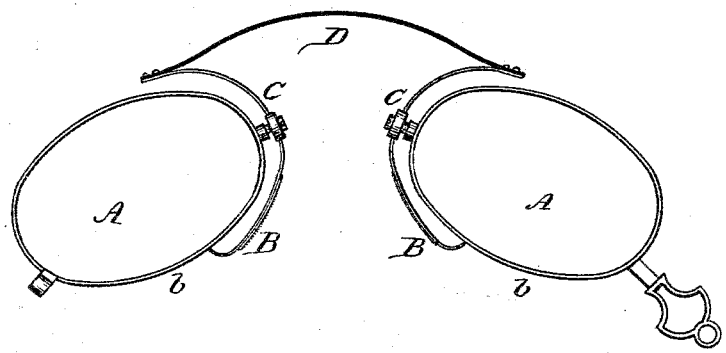
Figure 2:

Figure 1 is a front view, and Fig. 2 is a plan view, of eyeglasses having my invention.

Referring to the drawings, A designates the lenses, which may be mounted in the rims *b* or not, according as may be desired. B B are the nose-pieces, attached to the lenses or rims in the usual way. To these nose-pieces are secured the separate springs C, curved reversely and fastened, as shown, to a connecting-yoke, D, whose ends, projecting in opposite directions, are riveted or otherwise securely attached to said springs. The latter is appropriately of a semi-elliptical form, of such length as to overhang the tops of the lenses or frames coincident with the spring C, and consisting of a piece of metal having sufficient stiffness and resistance to resist the pressure or force of the spring. As seen, the springs are curved or bent outwardly over the rims or edge of the lenses, so that when the latter are spread apart the said edges or rims come in contact with the projecting ends of the springs at the points of their attachment to the yoke. The latter, being rigid, prevents any further bending of the springs, and thus avoids injury to the same.

It is obvious that either lens may be adjusted independently of the other by simply bending its attached spring, so as to adapt it to all irregularities of vision, conform to the anatomy of the nose, and prevent straining of the eyes.

I have shown the yoke as being a piece of metal to which the springs are riveted, but the springs and yoke may be integral.

What I claim is—

In eyeglasses, the springs extended over the lens or frames thereof, and a yoke having its ends attached to the ends of said springs, the connected end of the springs and yoke constituting an abutment for the lenses or frames at the top thereof.

In testimony that I claim the foregoing I have hereunto set my hand this 16th day of February, 1884.

IVAN FOX.

Witnesses:
CHARLES F. WALL,
G. B. McLAIN.